United States Patent
Senapati

(10) Patent No.: US 10,341,598 B1
(45) Date of Patent: Jul. 2, 2019

(54) METHOD FOR NOTIFYING A USER OF A TELEVISION TO SAVE POWER CONSUMPTION BY MULTIPLE MULTIMEDIA DEVICES CONNECTED TO THE TELEVISION

(71) Applicant: TP Vision Holding B.V., Amsterdam (NL)

(72) Inventor: Gyana Ranjan Senapati, Karnataka (IN)

(73) Assignee: TP VISION HOLDING B.V., Amsterdam (NL)

( * ) Notice: Subject to any disclaimer, the term of this patent is extended or adjusted under 35 U.S.C. 154(b) by 0 days.

(21) Appl. No.: 16/104,162

(22) Filed: Aug. 17, 2018

(30) Foreign Application Priority Data

Aug. 1, 2018 (EP) .................................. 18186812

(51) Int. Cl.
| | |
|---|---|
| H04N 5/445 | (2011.01) |
| H04N 5/63 | (2006.01) |
| H04N 7/01 | (2006.01) |
| H04N 7/015 | (2006.01) |

(52) U.S. Cl.
CPC ........... *H04N 5/44513* (2013.01); *H04N 5/63* (2013.01); *H04N 7/015* (2013.01); *H04N 2005/44521* (2013.01); *H04N 2005/44534* (2013.01)

(58) Field of Classification Search
CPC ...... H04N 5/445; H04N 5/44513; H04N 5/63; H04N 7/015; H04N 5/44; H04N 9/74; H04N 21/43635; H04N 21/4882; H04N 2005/44521; H04N 2005/44534

USPC ....... 348/563, 564, 584, 589, 598–600, 730, 348/725
See application file for complete search history.

(56) References Cited

U.S. PATENT DOCUMENTS

| | | | |
|---|---|---|---|
| 2008/0266455 | A1 | 10/2008 | Kim et al. |
| 2011/0032433 | A1 | 2/2011 | Sato |
| 2014/0132839 | A1 | 5/2014 | Chang et al. |
| 2014/0157326 | A1* | 6/2014 | Ida .................... H04N 21/42204 725/59 |
| 2014/0176807 | A1 | 6/2014 | Schafer et al. |
| 2015/0143433 | A1* | 5/2015 | Takada ............. H04N 21/43637 725/80 |

FOREIGN PATENT DOCUMENTS

GB    2443870 A    5/2008

OTHER PUBLICATIONS

Search Report issued to European counterpart application No. 18186812.6 by the EPO dated Feb. 13, 2019.

* cited by examiner

*Primary Examiner* — Sherrie Hsia
(74) *Attorney, Agent, or Firm* — Hamre, Schumann, Mueller & Larson, P.C.

(57) ABSTRACT

A method for notifying a user of a television to save power consumption by a plurality of multimedia devices connected to the television is proposed. When the television presents desired multimedia content based on signals provided by one of the multimedia device, the television detects whether the other multimedia device(s) is (are) providing signals of multimedia content at the same time. Upon detecting that any one of the other multimedia device(s) is providing signals of multimedia content, the television outputs a user-perceivable notification accordingly.

4 Claims, 2 Drawing Sheets

METHOD FOR NOTIFYING A USER OF A TELEVISION TO SAVE POWER CONSUMPTION BY MULTIPLE MULTIMEDIA DEVICES CONNECTED TO THE TELEVISION

CROSS-REFERENCE TO RELATED APPLICATION

This application claims priority of European Patent Application No. 18186812.6, filed on Aug. 1, 2018.

FIELD

The disclosure relates to a television function, and more particularly to a television function for enhancing power saving.

BACKGROUND

Nowadays, HDMI (high definition multimedia interface) technology is commonly used in televisions. A television may include multiple HDMI interface connectors that are used to connect multiple multimedia devices (e.g., STB (set top box) devices, Blu-ray or DVD players, videogame consoles, etc.) to the television. In use, a user may select only one or at most two multimedia devices (e.g., in a case that the PIP/PAP (picture-in-picture or picture-and-picture) function is used) to provide multimedia content for watching at a time. However, when the user changes the content source that provides the multimedia content from one multimedia device to another multimedia device, he or she may forget to have the multimedia device that originally served as the content source turned off or put on standby, resulting in unnecessary and undesired power consumption.

SUMMARY

Therefore, an object of the disclosure is to provide a method for notifying a user of a television to save power consumption by multiple multimedia devices connected to the television.

According to the disclosure, the multimedia devices include at least a first multimedia device and a second multimedia device, where the first multimedia device is connected to the television through a first interface connector, and the second multimedia device is connected to the television through a second interface connector.

The method includes: presenting, by the television, desired multimedia content to the user based on signals provided by the first multimedia device through the first interface connector; detecting, by the television, whether the second multimedia device is providing signals of multimedia content through the second interface connector during presentation of the desired multimedia content; and outputting, by the television and upon detecting that the second multimedia device is providing signals of multimedia content through the second interface connector during presentation of the desired multimedia content, a notification that is perceivable by the user and that relates to the provision of the signals by the second multimedia device. In one example, the detecting is performed by the television periodically.

In one example, each of the desired multimedia content and the multimedia content to be provided by the second multimedia device is a video content, and the outputting the notification includes displaying a text message indicating that the second multimedia device is in a power-on state.

In one example, the method further includes, after outputting the notification, issuing, by the television, a command to the second multimedia device through the second interface connector for putting the second multimedia device in a standby mode.

BRIEF DESCRIPTION OF THE DRAWINGS

Other features and advantages of the disclosure will become apparent in the following detailed description of the embodiment(s) with reference to the accompanying drawings, of which.

DETAILED DESCRIPTION

Figure 1:
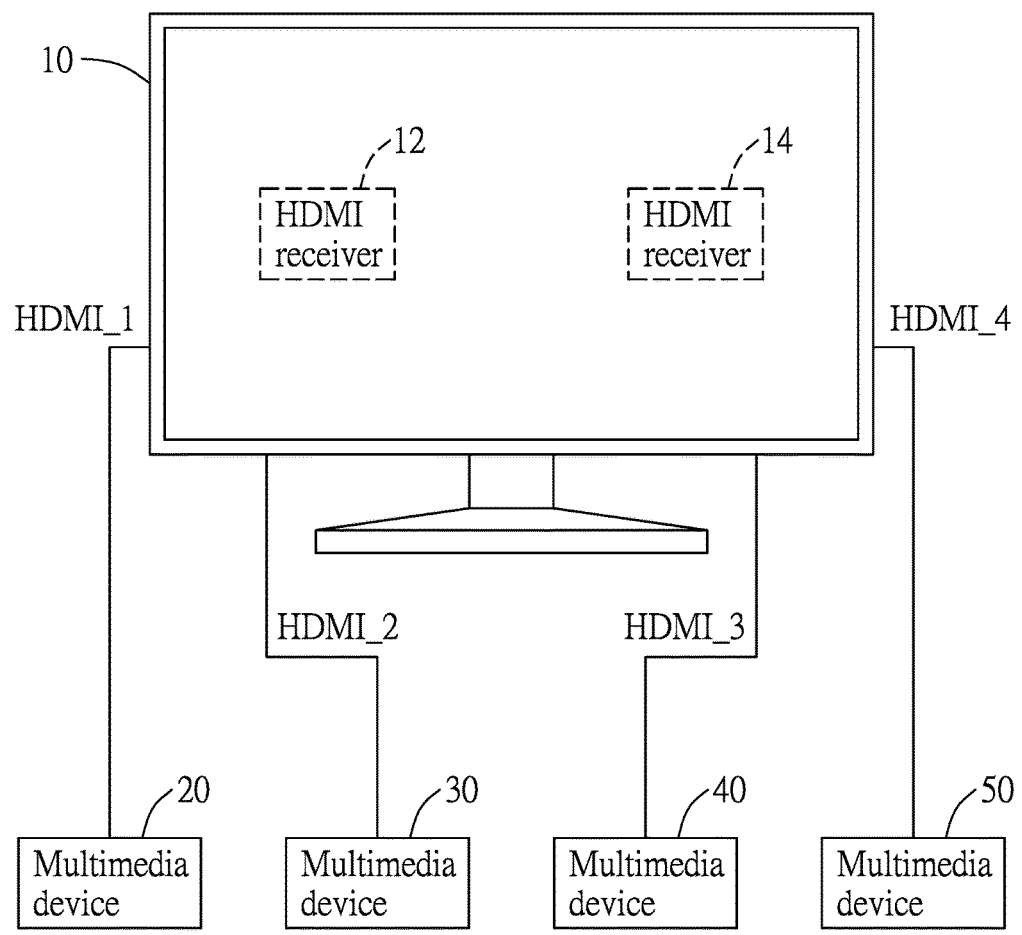
FIG. 1 is a block diagram illustrating a system for implementing an embodiment of the method for notifying a user of a television to save power consumption by multiple multimedia devices connected to the television according to the disclosure.

Before the disclosure is described in greater detail, it should be noted that where considered appropriate, reference numerals or terminal interface connectors of reference numerals have been repeated among the figures to indicate corresponding or analogous elements, which may optionally have similar characteristics.

FIG. 1 exemplarily shows a system to implement an embodiment of the method for notifying a user of the television 10 to save power consumption by a plurality of multimedia devices 20, 30, 40, 50 connected to the television 10. In this embodiment, the television 10 exemplarily has four HDMI connectors (interface connectors) "HDMI_1", "HDMI_2", "HDMI_3", "HDMI_4" to which the multimedia devices are respectively connected and two HDMI receivers 12, 14, but this disclosure is not limited in this respect. Each of the multimedia devices 20, 30, 40, 50 may be an STB device, a Blu-ray and DVD player, a video game console, a computer, or any other devices that can provide multimedia content to the television 10 through HDMI.

Figure 2:
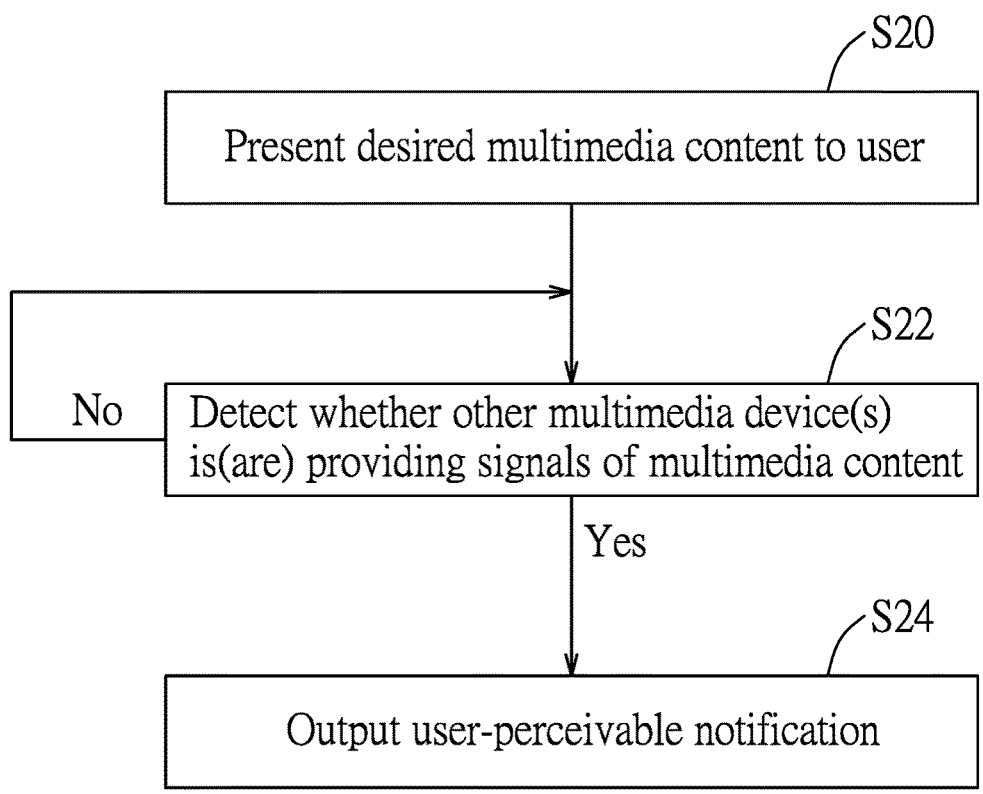
FIG. 2 is a flow chart illustrating steps of the embodiment.

Further referring to FIG. 2, the embodiment exemplarily includes steps S20, S22, S24. In step S20, the television 10 is operated to present desired multimedia content to the user based on signals provided by one of the multimedia devices (exemplified to be the multimedia device 20 hereinafter) through the corresponding HDMI connector (e.g., "HDMI_1"). In detail, the television 10 connects one of the HDMI receivers, such as the HDMI receiver 12, to the HDMI connector "HDMI_1" for receiving the signal from the multimedia device 20, thereby presenting the desired multimedia content.

During the presentation of the desired multimedia content, the television 10 uses the other HDMI receiver, such as the HDMI receiver 14, to detect, for each of the other multimedia devices 30, 40, 50 one by one, whether the multimedia device is providing signals of multimedia content (e.g., video content) through the corresponding HDMI connector in the background (step S22). The HDMI receiver 14 may detect information such as a SYNC signal, a clock signal, a field frequency, a number of vertical lines, a number of horizontal lines, etc., which may be included in the HDMI signals, to determine whether or not the multimedia device under detection is providing signals of multimedia content. In practice, the background detection may be performed periodically. For instance, the television 10 may connect the HDMI receiver 14 to the HDMI connectors 30, 40, 50 which are not used to present the multimedia content to the user one by one for background detection every two minutes, but this disclosure it not limited in this respect. In one implementation, the frequency of the background detection is user-configurable.

In one embodiment, the television may include only one HDMI receiver, so the background detection cannot be executed when the user is watching multimedia content provided by one of the multimedia devices that is connected to the television via an HDMI connector because the HDMI receiver is being occupied by the HDMI connector to present the multimedia content. However, in a case that the user is watching multimedia content provided through a tuner or another device that is connected to the television via a non-HDMI interface, the HDMI receiver is not occupied, so the background detection for the multimedia devices can still be executed.

Upon detecting that one of the other multimedia devices is providing signals of multimedia content through the corresponding HDMI connector during presentation of the desired multimedia content, in step S24, the television 10 outputs a notification that is perceivable by the user (e.g., in a form of a text message, an audio message, etc.) and that relates to the provision of the signals by said one of the other multimedia device.

As an example, upon detecting that the multimedia device 30 is providing signals of multimedia content during presentation of the desired multimedia content by the multimedia device 20, the television 10 may display "Device connected to HDMI 2 is in ON state but not used for watching. Device can be put on standby to save power", thereby notifying the user to turn off the unused device or put the unused device in a standby mode for saving power. In one embodiment, the television 10 may further issue a command that conforms to the HDMI-CEC (HDMI-consumer electronics control) specification to the multimedia device 30 through the HDMI connector "HDMI_2" for putting the multimedia device 30 in a standby mode, but this disclosure is not limited in this respect.

This disclosure uses HDMI to implement the embodiment because the HDMI-CEC specification supports the above-mentioned operations, but this disclosure is not limited thereto. Any interface supporting these operations can be used to implement the embodiment. For example, the background detection may also be implemented using DVI (digital visual interface) and VGA (video graphic array).

In summary, by virtue of the television scanning the unused multimedia device(s) during presentation of multimedia content, the television may notify the user to have the unused multimedia device(s) turned off or put on standby, so as to achieve the objective of saving power.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method for notifying a user of a television to save power consumption by a plurality of multimedia devices which are connected to the television and which include at least a first multimedia device and a second multimedia device, the first multimedia device being connected to the television through a first interface connector, the second multimedia device being connected to the television through a second interface connector, said method comprising:
   presenting, by the television, desired multimedia content to the user based on signals provided by the first multimedia device through the first interface connector;
   detecting, by the television, whether the second multimedia device is providing signals of multimedia content through the second interface connector during presentation of the desired multimedia content; and
   outputting, by the television and upon detecting that the second multimedia device is providing signals of multimedia content through the second interface connector during presentation of the desired multimedia content, a notification that is perceivable by the user and that relates to the provision of signals of multimedia content by the second multimedia device.

2. The method of claim 1, wherein the detecting is performed by the television periodically.

3. The method of claim 1, wherein each of the desired multimedia content and the multimedia content to be provided by the second multimedia device is a video content, and the outputting the notification includes displaying a text message indicating that the second multimedia device is in a power-on state.

4. The method of claim 1, further comprising, after outputting the notification, issuing, by the television, a command to the second multimedia device through the second interface connector for putting the second multimedia device in a standby mode.

\* \* \* \* \*